W. F. CONKLIN.
CLUTCH.
APPLICATION FILED MAR. 22, 1916.

1,215,779.

Patented Feb. 13, 1917.
2 SHEETS—SHEET 1.

Witnesses:

Inventor
William F. Conklin

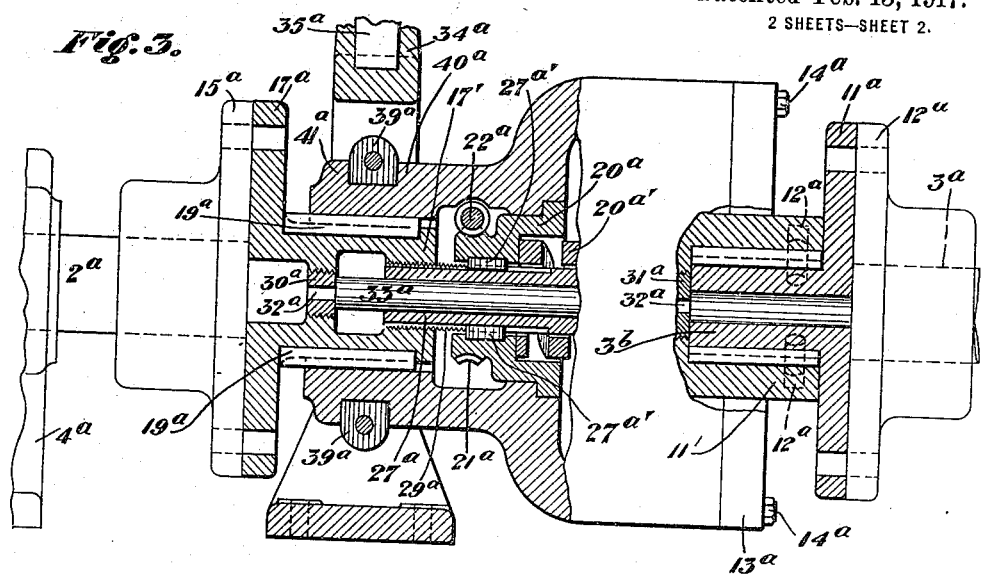
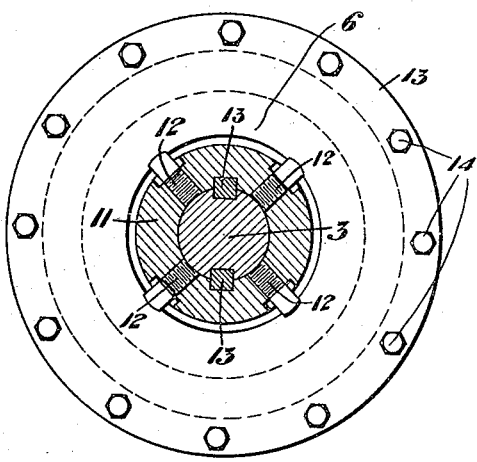
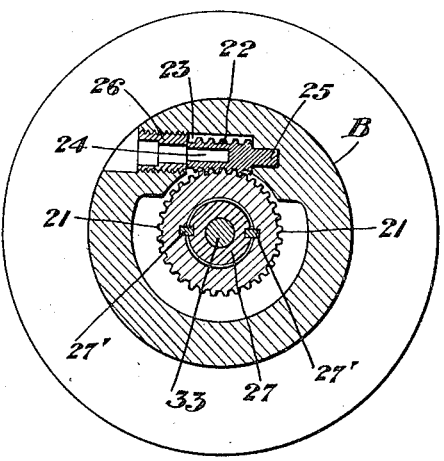

UNITED STATES PATENT OFFICE.

WILLIAM F. CONKLIN, OF TARENTUM, PENNSYLVANIA.

CLUTCH.

1,215,779.  Specification of Letters Patent.  Patented Feb. 13, 1917.

Application filed March 22, 1916. Serial No. 85,865.

*To all whom it may concern:*

Be it known that I, WILLIAM F. CONKLIN, a citizen of the United States, residing at Tarentum, in the county of Allegheny and State of Pennsylvania, have invented certain new and useful Improvements in Clutches, of which the following is a specification.

My invention consists of an improvement in friction clutches, and is designed for the purpose of providing a yielding connection between a driving and a driven element capable of accurate adjustment as to the frictional resistance interposed between said elements, for accomplishing the desired objects of such mechanism.

The device is designed especially for the purpose of transmitting driving power through frictional coupling mechanism utilizing interfitting frictional members, means for maintaining them in variable frictional engagement, and means for effecting engagement and disengagement of the active members with various other features of improvement and advantage as shall be more fully hereinafter set forth.

The invention is somewhat similar in its general characteristics to that of a companion application executed concurrently herewith.

One preferred embodiment of the invention is illustrated in the accompanying drawings, in which:—

Fig. 3 is a view similar to Fig. 1, but showing a modified construction utilizing flange connections with the driving and driven shaft.

Figures 1, 2:
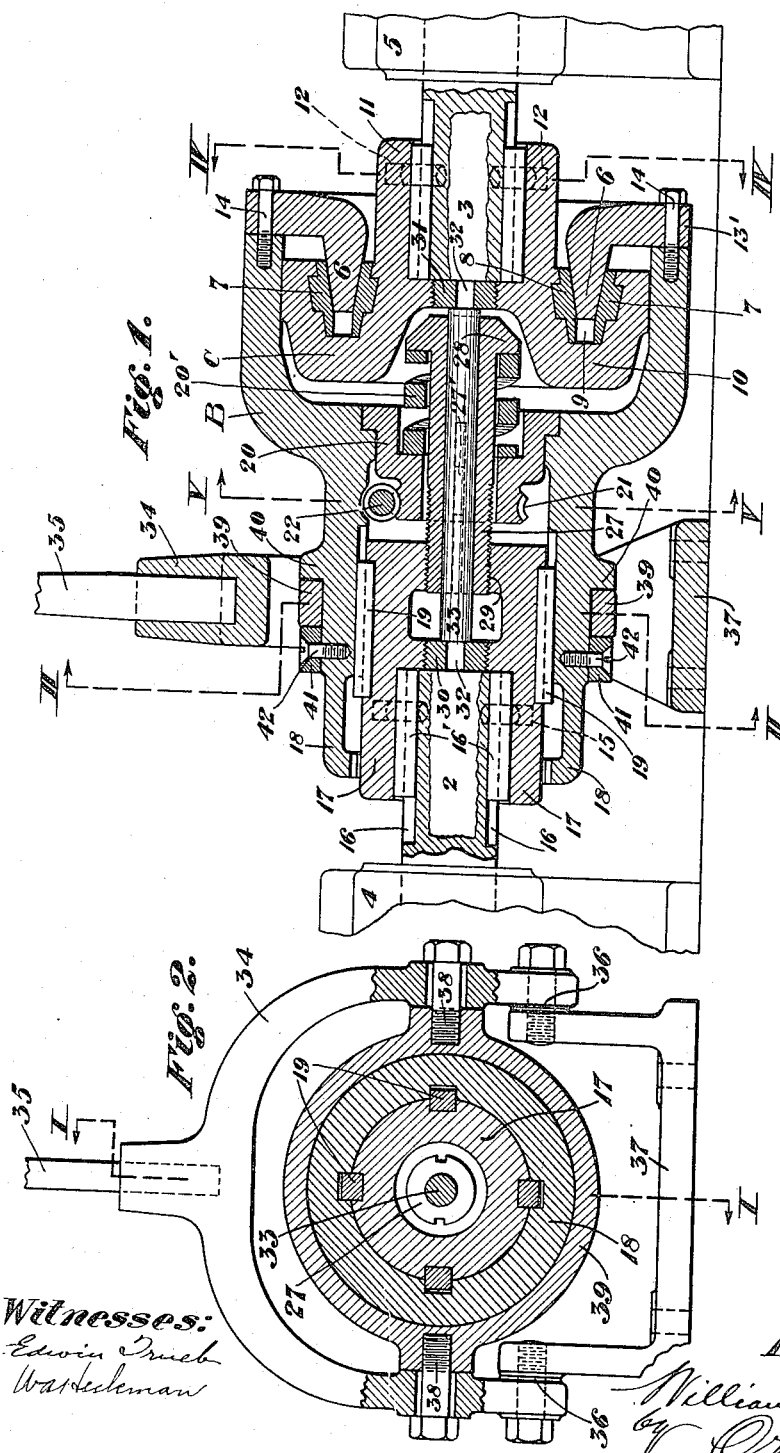
Figure 1 is a longitudinal vertical sectional view showing the operative mechanism of the clutch, indicated by the line I. I. of Fig. 2.
Fig. 2 is a cross sectional view, indicated by the line II. II. of Fig. 1.

Figs. 4 and 5 are cross sectional views, indicated by the lines IV. IV. and V. V. respectively.

I have shown the invention as applied to a driving shaft 2 and a driven shaft 3 mounted in suitable bearings 4, 5, respectively, and adapted to couple said shafts in driving engagement, at any desired tension as to intervening frictional mechanism.

The clutch mechanism as a whole comprises the two main interengaging members B and C, male and female respectively, member B being slidably and rotatably mounted with relation to shaft 2, and operable to frictionally engage with and disengage from member C, which is fixedly connected with driven shaft 3.

Member B embraces member C and is provided at its end portion with an inwardly extending annular tapered friction ring 6 which interfits within an annular corresponding space between bearing rings 7 and 8 respectively, which are mounted within a suitable annular receiving cavity 9 of a coupling head 10.

Rings 7 and 8, which may be split rings or composed of segments, have shouldered engagement within the annular recess of head 10 to insure their fixed positioning, and as thus arranged it will be seen that the inner and outer tapering faces of the frictional ring 6 engage the correspondingly tapered faces of rings 7 and 8, whereby to provide for snug engagement therewith when inserted, as in Fig. 1.

Head 10 is fixedly secured by its hub 11 and set screw 12 and keys 13, if desired, to shaft 3, so that when member B is in driving frictional engagement by its extension 6, rotation will be imparted to head 10 and shaft 3. Ring 6 is preferably formed integrally with the main ring portion 13', which is secured by bolts 14 or otherwise to the annular end face of member B.

Secured to shaft 2 by similar set screws 15 and keys 16' in keyways 16, if desired, is the normally rotating head 17. Said head is cylindrical, and has mounted around it the rear reduced barrel portion 18 of male member B, adapted to slide longitudinally on head 17 and to maintain rotatable engagement therewith at all times by a series of keys or feathers 19.

Male member B is normally retained in frictional driving engagement with member C by the tension of a spring 20' which bears inwardly at one end against an adjustable bearing bushing 20 which is rotatably mounted at the central portion of the member B, and is provided at one end with a series of worm teeth 21 in engagement with an actuating worm 22. Said worm 22 is mounted within a suitable receiving socket 23 in the side of the shell portion of member B, and is provided with a squared turning socket 24, whereby the worm may be actuated from the exterior, for rotative adjustment of bushing 20, as will be readily understood.

Worm 22 is preferably provided with a bearing terminal 25 at its inner end and a hollow retaining bushing 26 at the other end for proper positioning.

Extending centrally through bushing 20 is a hollow bearing stem 27 provided at one end with an enlarged head 28, providing a bearing for the other end of spring 20'.

Bushing 20 is in splined engagement with stem 27 by key 27', so that, as the bearing is rotated by its worm gearing, it will also rotate hollow stem 27, and said stem is threaded, as indicated at 29, into one end of head 17. By this means the adjustment of stem 27 toward or from head 17 will compress or loosen spring 20', varying the amount of pressure through bushing 20 against member B, tending to draw the friction ring 6 inwardly between the bearing rings 7, 8, to the desired degree.

By this means, adjustment through the worm gearing of bushing 20, imparting rotation and resulting screw feed to spindle 27, lengthens or shortens the distance between the head 28 and the bearing socket of bushing 20 for the above stated purpose.

In order to maintain the head 17 fixedly spaced away from female member C, each is provided with a terminal inserted bushing 30, 31, respectively, each having a squared central hole 32, by which it may be inserted or adjusted. A cylindrical spindle 33 extending centrally through hollow stem 27 abuts against said bushings 30 and 31, thereby providing a rigid intervening bracing element, upon which the stem 27 may freely rotate or move longitudinally.

For the purpose of shifting member B to thrust it out of frictional engagement, in the direction of member C, withdrawing friction ring 6 from binding engagement, I provide the yoke 34 having a handle 35, the yoke being fulcrumed at 36, 36, to suitable bearings extending upwardly from a supporting bracket 37. The yoke is also pivoted by stud bolts 38, 38, and is also connected with a shifting ring 39, which embraces the barrel portion 18 of member B between an annular shoulder 40 and a retaining ring 41. Said ring is secured by screws or bolts 42, as shown, to facilitate application or removal of ring 39.

By the above described means, when the lever 35 is shifted toward the female member C, member B is immediately disconnected, and the transmission of the power is discontinued. Upon releasing the lever, spring 20' will thrust member B backwardly, re-inserting ring 6 between liners 7, 8, with a pressure and frictional engagement depending upon the tension of spring 20' as controlled by the adjustment of stem 27, as above described.

It will be observed that all strain and load is thereby released from the operating lever itself, the action being practically automatic, upon coupling, and that, on the other hand, upon actuating lever 35, the clutch is immediately disconnected, simultaneously relieving shaft 3 and its connected parts from any driving pressure.

When desired, the clutch mechanism may be connected with the driving and driven shafts by flange joints, as illustrated in Fig. 3. In such case, the head 17' is provided with a flange 17$^a$ adapted to be bolted to flange 15$^a$ of an ordinary flange coupling secured to shaft 2$^a$. Likewise hub 11' of member C may be provided with a similar flange 11$^a$ adapted to be coupled to flange 12$^a$ of driven shaft 3$^a$, flange 11$^a$ being connected in any desired manner, as by a central stud 3$^b$, corresponding to shaft 3, and inserted in a similar socket provided therefor, as shown in Fig. 1.

The construction and operation of the device will be readily understood and appreciated from the foregoing description.

The operative members of the clutch being in frictional engagement to the desired degree, will allow for any necessary slippage, so that power may be imparted through the clutch to any driven element within the transmitting capacity of the clutch, while providing for slippage under undue strains, and for prompt disconnection by the lever mechanism described.

It will be readily understood that the invention may be variously utilized or applied to various kinds of mechanism for imparting motion thereto through the intervening clutch, and that it may be variously changed or modified by the skilled mechanic in different details or features of construction, but that all such changes are to be considered as within the scope of the following claims.

What I claim is:

1. Clutch mechanism comprising interfitting male and female friction members, a driving member in splined engagement with one of said members, a centrally arranged tightening and loosening stem in one of said members having threaded engagement with said driving member, a cushioning spring engaging said stem at one end, a rotatable barrel in said member providing a bearing for the other end of the spring and in splined engagement with said stem, and means for actuating said barrel.

2. Clutch mechanism comprising interfitting male and female friction members, a driving member in splined engagement with one of said members, a centrally arranged tightening and loosening stem in one of said members having threaded engagement with said driving member, a cushioning spring engaging said stem at one end, a rotatable barrel in said member providing a bearing for the other end of the spring and in splined engagement with said stem, means for actuating said barrel, and means for thrusting said clutch member longitudinally for engagement or disengagement with its co-acting member.

3. Clutch mechanism comprising interfitting male and female friction members, a driving member operatively engaging one of said friction members, a centrally arranged tightening and loosening stem in one of said members having threaded engagement with said driving member, a cushioning spring engaging said stem at one end, a rotatable barrel in said member providing a bearing for the other end of the spring and in splined engagement with said stem, and a shifting yoke and lever adapted to shift said one of said friction members into and out of operative engagement with its co-acting member.

4. In a clutch, a male and a female friction member in operable relation, means for moving one of said members toward and from the other member, means for maintaining driving engagement between said member and a driving shaft, and means within said movable member for providing variable resistance between said member and its co-acting member, provided with an adjusting device extending laterally through to the exterior of one of said friction members.

5. In a clutch, a male and a female friction member in operable relation, means for moving one of said members toward and from the other member, means for maintaining driving engagement between said member and a driving shaft, means within said movable member for providing resilient resistance between said member and its co-acting member, and means for adjusting said resistance provided with an actuating element extending through to the exterior of the movable member.

6. In combination, a driving shaft, a head thereon, a clutch member in splined engagement with said head, a stem adjustably mounted in the end of said head having a terminal abutment, a rotatable bearing in the clutch member in splined engagement with said stem, means for actuating said bearing, a spring bearing against said bearing and said terminal abutment, an actuating lever for said clutch member, and a co-acting clutch member.

7. In combination, a driving shaft, a head thereon, a clutch member in splined engagement with said head, a stem adjustably mounted in the end of said head having a terminal abutment, a rotatable bearing in the clutch member in splined engagement with said stem, means for actuating said bearing, a spring bearing against said bearing and said terminal abutment, an actuating lever for said clutch member, a co-acting clutch member, and a bracing spindle extending through said stem and bearing against the shaft head and said co-acting clutch member respectively.

In testimony whereof I hereunto affix my signature in the presence of a witness.

WILLIAM F. CONKLIN.

Witness:
W. A. HECKMAN,